United States Patent Office 3,086,831
Patented Apr. 23, 1963

3,086,831
COMPOSITIONS OF A PYRAZOLONE AZO DYE WITH POLYVINYLPYRROLIDONE
Woodrow W. Robbins, Plainfield, N.J., assignor to American Cyanamid Company, New York, N.Y., a corporation of Maine
No Drawing. Filed July 1, 1959, Ser. No. 824,185
5 Claims. (Cl. 8—42)

This invention relates to dye compositions which are soluble in water. More particularly, this invention relates to dye compositions comprising a metallized dye having one atom of chromium chelated with two molecules of a pyrazolone azo dye of the formula

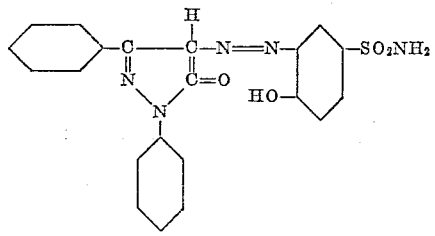

and 1 to 20% by weight of polyvinylpyrrolidone. These dyeing compositions have excellent solubility in water and have excellent utility for use in dyebaths at or near the neutral point. They are especially useful for the dyeing of nitrogenous fibers such as wools and nylon.

The metallized dyestuff which is a component of the compositions of this invention is not by itself soluble enough for use directly in a dyebath. It must first be solubilized, either by blending with a suitable dispersing agent or by adding a dispersing agent to a suspension of the dyestuff in the dyebath. Dispersing agents ordinarily found suitable for solubilizing azo dyestuffs are not effective in dissolving or dispersing the dyestuff of this invention.

I have found that polyvinylpyrrolidone is a highly effective solubilizing agent when used in blends of the half chromium complex of the dye prepared by coupling 2-aminophenol-4-sulfonamide to 1,3-diphenyl-5-pyrazolone.

The dyestuff may be prepared by the usual azo coupling methods and may be metallized with chromium by the usual methods for the preparation of the half chromium complex, i.e. the complex having two molecules of dyestuff chelated with one atom of chromium. Metallizations may be in aqueous or non-aqueous medium as shown in my examples.

The product thus obtained is dried and ground or blended with 1 to 20% of its weight of polyvinylpyrrolidone to produce the blends of my invention. Less than 1% of polyvinylpyrrolidone causes incomplete solubilization. Probably the most satisfactory amount is in the 5 to 8% range. If the blend is to be used for wool the amount of polyvinylpyrrolidone is best limited to 8% since higher amounts slow the exhaustion rate of the dye in the dyebath. For instance 15% by weight of polyvinylpyrrolidone causes dyeings to be 10–15% weak on wool, unless additional acetic acid is used. However, the same blend having 15% is entirely satisfactory for use in dyeing nylon. If a dyestuff is too soluble it tends to remain in the dyebath and not go onto the wool fiber. The upper limit of 20% by weight of polyvinylpyrrolidone in blends is the maximum giving a good exhaustion rate.

The characteristic which distinguishes the blends of my invention is the property of dissolving in water to give clear solutions. This property can be measured by testing the solution with a Fisher Nefluoro-Photometer, a standard instrument for measuring turbidity. The solutions obtained from my invention give a Nefluoro-Photometer reading of less than 5, indicating practically no turbidity at all, whereas when other dispersing agents are tried, they universally give turbid solutions.

Sugar is used as a diluent and is optional in the blends. As sugars, one can use any readily available mono or disaccharide such as sucrose, dextrose, maltose, invert sugar, cerelose, fructose and the like. Methods are given in Examples 8 and 9 for the dyeing of wool and nylon. When the blends of this invention are used in such dyeing procedures, strong scarlet shades of excellent fastness to light are obtained. Besides wool and nylon, the compositions of this invention are suitable for the coloring of Vicara and other nitrogenous fibers as well as leather.

My invention can be illustrated by the following examples in which parts are by weight unless otherwise specified.

EXAMPLE 1

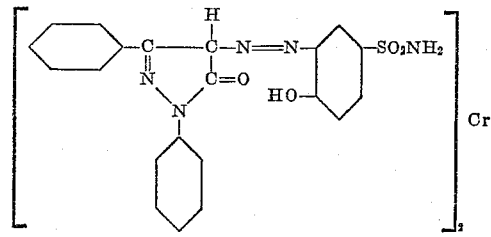

The coupling product is prepared as follows: Twelve moles of 2-aminophenol-4-sulfonamide is dissolved in 21,300 parts of water and 30 moles of concentrated hydrochloric acid. The amine is diazotized by adding 12.0 mole of sodium nitrite while holding the mixture at 5–10° C. A solution of 12.6 moles of 1,3-diphenyl-5-pyrazolone in 54,300 parts of water containing 14.5 moles of caustic soda and 17.9 moles of soda ash is cooled to 3–6° C. The diazo solution is run in with stirring, keeping the mixture below 6° C. The coupling mixture is then heated to 45–50° C. and 15 moles of caustic soda is added. The product is filtered and washed with water.

This material is then metallized in formamide medium by the following procedure. 12.8 parts of the coupling product is added to 100 parts by volume of dimethylformamide. 2.64 parts of chromium triacetate (24.7% Cr) is added and the mixture is heated to 125° C. and held there until metallization is substantially complete. The dimethylformamide solution of dye is cooled and poured with stirring into a filtered solution of 200 parts of NaCl in 600 parts of water. The resulting dye slurry is stirred and then filtered, washed with water and dried at 65° C.

EXAMPLE 2

The product of Example 1 is blended as follows

| | Grams |
|---|---|
| Product of Example 1 | 0.26 |
| Polyvinylpyrrolidone | 0.05 |
| Sucrose | 0.69 |
| Total | 1.00 |

This blend is tested by the concentrated solubility test shown in Example 5 in detail. Fisher Nefluoro-Photometer reading was 6.

When dyed on wool using the method of Example 8, bright scarlet shades of good fastness to light are obtained.

EXAMPLE 3

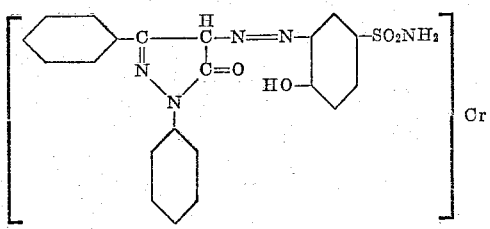

The filter cake from the coupling in Example 1 is slurried in 47,500 parts of water. 21.7 moles of caustic soda is added. A sodium chromotartrate solution containing 6.0 moles of chromium is added. The mixture is heated to boil and stirred at the boil until metallization is complete. The mixture is then cooled to 90 to 95° C. and 14.5 moles of caustic soda and sodium chloride (5% of volume) is added. The mixture is cooled to 60 to 65° C. with ice and the sodium chloride content is adjusted to a minimum of 4%. 50 moles of glacial acetic acid is then added. The mixture is filtered at 60 to 65° C. and the product is washed with water. The filter cake is dried at 60 to 65° C.

EXAMPLE 4

0.26 gram samples of the dyestuff of Example 3 are ground to 40 mesh and blended with finely divided polyvinylpyrrolidone and sucrose in the following combinations:

BLENDS

| Materials | A, g. | B, g. | C, g. | D, g. |
|---|---|---|---|---|
| Product of Example 3 | 0.26 | 0.26 | 0.26 | 0.26 |
| Polyvinylpyrrolidone | .01 | .05 | .10 | .15 |
| Sucrose | .73 | .69 | .64 | .59 |
|  | 1.00 | 1.00 | 1.00 | 1.00 |

When dyed on wool or spun nylon, using the procedures of Example 8 and 9 respectively, bright scarlet shades of good fastness to washing and light are obtained.

EXAMPLE 5

Blends A, B, C and D of Example 4 are placed in separate 150 ml. beakers. One hundred ml. of boiling distilled water is added slowly while stirring with a glass rod. The beakers are placed on a wire gauze and heated by means of a Bunsen burner to the boil (intermittent stirring). The samples are boiled one minute without stirring and then allowed to stand two hours. Three ml. of each solution is diluted to 100 ml. with distilled water and the turbidity is compared with a Stellar clay "ASP 200" blank (.0025 g./ml.) using a Fisher Nefluoro-Photometer.

The remainder of the concentrated solubility solution is filtered through a Buchner funnel fitted with a single sheet of Reeve Angel No. 202 filter paper. After drying the paper is observed for residue. The results are as follows:

| | Appearance of Solution | | Fisher Nefluoro-Photometer Reading | Residue on Paper |
|---|---|---|---|---|
| | At Boil | After 2 Hours | | |
| Blend A | sl. turbid | turbid | 55 | none. |
| Blend B | clear | v. sl. turb | 4 | Do. |
| Blend C | do | clear | 2 | Do. |
| Blend D | do | do | 1 | Do. |

EXAMPLE 6

If, in Example 4, the diluent sugar is omitted from the blends and the blends are tested according to Example 5, the results are similar to those obtained in the presence of sugar.

EXAMPLE 7

If, in Example 4, in place of polyvinylpyrrolidone, such commercial dispersing agents as Nacconol NR or Santomerse No. 1 (both alkyl aryl sulfonates) are used, only turbid solutions are obtained.

BLENDS
[Per 0.26 g. dye of Example 3]

| Grams Nacconol NR | Grams Santomerse No. 1 | Grams Sugar | Fisher Nefluoro-Photometer Reading |
|---|---|---|---|
| .05 | | .69 | 75 |
| .10 | | .64 | 86 |
| .15 | | .59 | 91 |
| | .05 | .69 | 97 |
| | .10 | .64 | 95 |
| | .15 | .59 | 92 |

EXAMPLE 8

*Procedure for the Dyeing of the Blended Dyes of Examples 2 and 4 on Wool*

Solution: 1 gram of dye blend per 500 ml.
Material: 5 grams wool skein.
Procedure:
(1) Add the 1.0% of the dye (25 ml. of a 1 g. per 500 ml. solution).
(2) Dilute to 300 ml. with distilled water (60–1 volume).
(3) Add 3% ammonium acetate (1.5 ml. of a 10% solution).
(4) Enter wet-out wool skein.
(5) Bring to a near boil in 30 minutes (using water bath).
(6) Transfer to a calcium chloride bath and raise to a boil.
(7) Boil 45 minutes.
(8) Add 3% ammonium acetate (1.5 ml. of a 10% solution).
(9) Boil 30 minutes.
(10) Rinse well and dry.

EXAMPLE 9

*Procedure for the Dyeing of the Blended Dyes of Examples 2 and 4 on Spun Nylon*

Solution: 1 gram of dye blend in 500 ml. of solution.
Material: 5 grams skein of spun nylon.
Procedure:
(1) 1.0% dye (25 ml. of a 1 gram per 500 ml. solution).
(2) Dilute to 300 ml. with distilled water (60.1 volume).
(3) Add 3% ammonium acetate (1.5 ml. of a 10% solution).
(4) Enter wet-out spun nylon skein.
(5) Bring to a near boil in 30 minutes (using water bath).
(6) Transfer to calcium chloride bath and raise to a boil.
(7) Boil 45 minutes.
(8) If completely exhausted, continue boiling 30 minutes without additional ammonium acetate. (Use 3% ammonium acetate if not exhausted.)
(9) Rinse well and dry.

I claim:
1. A dye composition comprising a heavy metal dye complex having one atom of chromium chelated with two molecules of the dyestuff of the formula

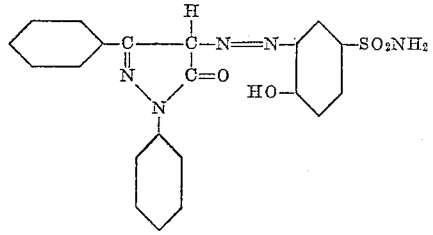

and 1 to 20% by weight of polyvinylpyrrolidone based on the weight of said dye complex, the said composition being characterized by dissolving in water to give a solution with a Nefluoro-photometer reading of less than 5.

2. The dye compositions of claim 1 having 5 to 8% inclusive, by weight of polyvinylpyrrolidone.

3. The dye composition of claim 1 having about 5% of polyvinylpyrrolidone based on the weight of the dye complex and about 69% of sugar based on the weight of the dye complex.

4. The dye composition of claim 1 having about 8% of polyvinylpyrrolidone based on the weight of the dye complex and about 66% of sugar based on the weight of said dye complex.

5. The dye composition of claim 1 having about 20% of polyvinylpyrrolidone based on the weight of said dye complex and about 54% of sugar based on the weight of said dye complex.

References Cited in the file of this patent

UNITED STATES PATENTS

| | | |
|---|---|---|
| 1,239,526 | Schmidt | Sept. 11, 1917 |
| 1,711,009 | Bauer et al. | Apr. 30, 1929 |
| 2,784,178 | Zickendraht et al. | Mar. 5, 1957 |
| 2,784,179 | Zickendraht et al. | Mar. 5, 1957 |
| 2,806,760 | Brassel et al. | Sept. 17, 1957 |
| 2,903,325 | Geigy | Sept. 8, 1959 |